United States Patent
Jonas et al.

(10) Patent No.: US 6,498,821 B2
(45) Date of Patent: Dec. 24, 2002

(54) SPACE DIVERSITY METHOD AND SYSTEM FOR BROADBAND WIRELESS ACCESS

(75) Inventors: Ammon Jonas, Jerusalem (IL); Claude Albo, Jerusalem (IL)

(73) Assignee: Vyyo, Ltd., Jerusalem (IL)

( * ) Notice: Subject to any disclaimer, the term of this patent is extended or adjusted under 35 U.S.C. 154(b) by 0 days.

(21) Appl. No.: 09/771,326

(22) Filed: Jan. 26, 2001

(65) Prior Publication Data

US 2001/0046271 A1 Nov. 29, 2001

Related U.S. Application Data

(60) Provisional application No. 60/178,242, filed on Jan. 26, 2000.

(51) Int. Cl.$^7$ .................................................. H04B 7/10
(52) U.S. Cl. ........................................ 375/347; 375/349
(58) Field of Search .................................. 375/347, 349, 375/316, 337, 130, 341, 267, 224; 370/320, 335, 342; 455/132, 133, 134, 135, 137, 296, 303, 277.2, 429, 54.1

(56) References Cited

U.S. PATENT DOCUMENTS

| 4,010,465 A | 3/1977 | Dodington et al. |
| 4,099,121 A | 7/1978 | Fang |
| 4,385,384 A | 5/1983 | Rosbury et al. |
| 5,052,024 A | 9/1991 | Moran, III et al. |

(List continued on next page.)

FOREIGN PATENT DOCUMENTS

| CA | 2187141 | 4/1998 |
| EP | 0021 544 A1 | 1/1981 |
| EP | 0025 767 A1 | 3/1981 |

OTHER PUBLICATIONS

Golestani, S. (1995) "Network Delay Analysis of a Class of Fair Queueing Algorithms", *IEEE Journal on Selected Areas in Communication* 13(6):1057–1070.

Stiliadis, D. et al. (1998) "Rate–Proportional Servers: A Design Methodology for Fair Queueing Algorithms", *IEEE/ACM Transactions of Networking* 6(2):164–174.

Stiliadis, D. et al. (1998) "Efficient Fair Queuing Algorithms for Packet–Switched Networks", *IEEE/ACM Transactions of Networking* 6(2):175–185.

Data Over Cable Interface Specifications, Cable Modem Termination System–Network Side Interface Specification, SP–CMTS–NSII01–960702 (Jul. 2, 1996) pp. i–13.

Data–Over–Cable Service Interface Specifications, Cable Modem to Customer Premise Equipment Interface Specification. SP–CMC1–102–980317 (Mar. 17, 1998) pp. i–40.

Data–Over–Cable Service Interface Specifications, Radio Frequency Interface Specification, SP–RFI–I04–980724 (Jul. 24, 1998) pp. i–196.

Data–Over–Cable Service Interface Specifications, Operations Support System Interface Specification SP–OSSI–102–990113 (Jan. 13, 1999) pp. i–14.

Data–Over–Cable Service Interface Specifications, Operations Support System Interface Specification Radio Frequency Interface, SP–OSSI–RFI–103–990113 (Jan. 13, 1999) pp. i–29.

(List continued on next page.)

*Primary Examiner*—Chi Pham
*Assistant Examiner*—Emmanuel Bayard
(74) *Attorney, Agent, or Firm*—Crosby, Heafey, Roach & May; John W. Carpenter

(57) ABSTRACT

Spatially diverse signals are simultaneously demodulated and error corrected providing statistically independent data. Statistics for the signals are prepared and available for system management and display to users.

25 Claims, 2 Drawing Sheets

U.S. PATENT DOCUMENTS

| | | | |
|---|---|---|---|
| 5,272,700 A | 12/1993 | Hansen et al. | |
| 5,311,550 A | 5/1994 | Fouche et al. | |
| 5,377,035 A | 12/1994 | Wang et al. | |
| 5,408,349 A | 4/1995 | Tsushima et al. | |
| 5,471,645 A | 11/1995 | Felix | |
| 5,481,542 A | 1/1996 | Logston et al. | |
| 5,481,561 A | 1/1996 | Fang | |
| 5,487,099 A | 1/1996 | Maekawa | |
| 5,510,859 A | 4/1996 | Douglass et al. | |
| 5,541,963 A * | 7/1996 | Nakagoshi | 375/347 |
| 5,557,612 A | 9/1996 | Bingham | |
| 5,590,409 A | 12/1996 | Sawahashi et al. | |
| 5,596,604 A | 1/1997 | Cioffi et al. | |
| 5,606,664 A | 2/1997 | Brown et al. | |
| 5,625,874 A | 4/1997 | Uchida et al. | |
| 5,634,206 A | 5/1997 | Reed et al. | |
| 5,666,646 A | 9/1997 | McCollum et al. | |
| 5,724,385 A | 3/1998 | Levin et al. | |
| 5,734,589 A | 3/1998 | Kostreski et al. | |
| 5,740,525 A | 4/1998 | Spears | |
| 5,752,161 A | 5/1998 | Jantti et al. | |
| 5,757,866 A * | 5/1998 | Kannari et al. | 375/347 |
| 5,796,783 A | 8/1998 | Crawford | |
| 5,809,090 A | 9/1998 | Buternowsky et al. | |
| 5,809,406 A | 9/1998 | Taki et al. | |
| 5,809,427 A | 9/1998 | Perreault et al. | |
| 5,818,825 A | 10/1998 | Corrigan et al. | |
| 5,831,690 A | 11/1998 | Lyons et al. | |
| 5,859,870 A * | 1/1999 | Tsujimoto | 375/200 |
| 5,862,451 A | 1/1999 | Grau et al. | |
| 5,867,528 A | 2/1999 | Verbueken | |
| 5,896,414 A | 4/1999 | Meyer et al. | |
| 5,903,558 A | 5/1999 | Jones et al. | |
| 5,909,384 A | 6/1999 | Tal et al. | |
| 5,930,305 A * | 7/1999 | Leib | 375/324 |
| 5,937,005 A * | 8/1999 | Obuchi et al. | 375/224 |
| 5,940,743 A | 8/1999 | Sunay et al. | |
| 5,960,330 A * | 9/1999 | Azuma | 455/70 |
| 5,963,843 A | 10/1999 | Sit et al. | |
| 5,963,870 A | 10/1999 | Chheda et al. | |
| 5,974,106 A | 10/1999 | Dupont | |
| 5,978,855 A | 11/1999 | Metz et al. | |
| 5,991,286 A | 11/1999 | Labonte et al. | |
| 6,009,310 A | 12/1999 | Motohashi | |
| 6,018,647 A * | 1/2000 | Fitzgerald | 455/135 |
| 6,023,615 A * | 2/2000 | Bruckert et al. | 455/277.2 |
| 6,035,008 A | 3/2000 | Kim | |
| 6,052,408 A | 4/2000 | Trompower et al. | |
| 6,061,336 A * | 5/2000 | Baker | 370/320 |
| 6,072,839 A | 6/2000 | Mondal et al. | |
| 6,075,787 A | 6/2000 | Bobeck et al. | |
| 6,084,926 A * | 7/2000 | Zak et al. | 375/341 |
| 6,108,548 A * | 8/2000 | Furukawa et al. | 455/442 |
| 6,111,887 A | 8/2000 | Daily et al. | |
| 6,112,232 A | 8/2000 | Shahar et al. | |
| 6,128,588 A | 10/2000 | Chacon | |
| 6,140,911 A | 10/2000 | Fisher et al. | |
| 6,141,356 A | 10/2000 | Gorman | |
| 6,157,311 A | 12/2000 | Berkovich | |
| 6,160,447 A | 12/2000 | Huang | |
| 6,172,970 B1 | 1/2001 | Ling et al. | |
| 6,185,227 B1 | 2/2001 | Sipola | |
| 6,195,697 B1 | 2/2001 | Bowman-Amuah | |
| 6,208,858 B1 * | 3/2001 | Antonio et al. | 455/429 |
| 6,229,840 B1 * | 5/2001 | Ichihara | 375/147 |
| 6,259,721 B1 * | 7/2001 | Uesugi et al. | 375/130 |
| 6,351,499 B1 * | 2/2002 | Paulraj et al. | 375/267 |

OTHER PUBLICATIONS

Data–Over–Cable Service Interface Specifications, Baseline Privacy Interface Specification, SP–BPI–102–990319 (Mar. 19, 1999) pp. i–88.

Data–Over–Cable Service Interface Specifications, Baseline Privacy Interface Specification, SP–BPI–102–990731 (Jul. 31, 1999) pp. i–160.

Data–Over–Cable Service Interface Specifications, Radio Frequency Interface Specification, SP–RFIv1.1–I03–991105 (Nov. 5, 1999) pp. i–366.

Data–Over–Cable Service Interface Specifications, Operations Support System Interface Specification SP–OSSIv1.1–D01–991115 (Nov. 15, 1999) pp. i–81.

Data–Over–Cable Service Interface Specifications, Operations Support System Interface Specification SP–OSSIv1.1–103–001220 (Dec. 20, 2000) p. ii.

* cited by examiner-

SPACE DIVERSITY METHOD AND SYSTEM FOR BROADBAND WIRELESS ACCESS

CROSS REFERENCE TO RELATED APPLICATIONS AND CLAIM OF PRIORITY

This invention claims priority to the following co-pending U.S. provisional patent application, which is incorporated herein by reference, in its entirety:

Jonas et al, Provisional Application Serial No. 60/178,242, entitled "SPACE DIVERSITY METHOD AND SYSTEM FOR BROADBAND WIRELESS ACCESS," filed Jan. 26, 2000.

BACKGROUND OF THE INVENTION

1. Field of Invention

The present invention relates generally to the field of data transmission and more particularly to a method of post-detection selection space diversity for reducing the deleterious effects of fading and multi-path interference in wireless modems..

2. Discussion of Background

Wireless modems are used to interconnect computers or LANs using radio waves. Radio signals have advantages and disadvantages over hardwire systems. The wireless advantages include quick deployment, higher data rates than conventional telephone lines and the ability to serve customers independently of the traditional infrastructure.

The disadvantages of wireless transmission in the range of the MMDS/ITFS (multi-channel multi-point distribution system/instructional television fixed service) channels include the problem that the RF signal requires a line of sight path and strong mechanisms to decrease time lapse due to fading and multi-path.

SUMMARY OF THE INVENTION

The present inventors have realized that a space diversity system can be implemented in a wireless hub of a transmission system to reduce the disadvantages mentioned above and improve the performance of a wireless system. The present invention provides an optimized analysis of statistically independent diverse signals that increases the robustness and performance of a wireless hub.

The present invention is embodied as a method of space diversity for broadband wireless access, comprising the steps of, receiving spatially diverse signals, separately demodulating each of the spatially diverse signals, selecting a most correct of the demodulated signals, and forwarding the selected demodulated signal for further processing.

The present invention includes a space diversity device for a wireless hub, comprising, PHY layer equipment, including, a set of at least two antennas for receiving spatially diverse signals, a demodulator connected to each of said antennas, and each demodulator configured to demodulate signals received on the antenna connected to it, and MAC layer equipment comprising a selection mechanism configured to select a demodulated signal having a largest error free transmission.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The following description is provided to enable any person skilled in the art to make and use the invention and sets forth the best mode contemplated by the inventor for carrying out the invention. Various modifications, however, will remain readily apparent to those skilled in the art, since the basic principles of the present invention have been defined herein specifically to provide a method for post-detection selection space diversity for a wireless modem termination system.

In general, the present invention relates to the DOCSIS1.0 (Data Over Cable Service Interface Specification) and DOCSIS1.1 specifications promulgated by Cable Labs, the disclosures of which are herein incorporated by reference. Whereas the DOCSIS standards address data over cable, the present invention relates to wireless data transmission.

Figure 1:
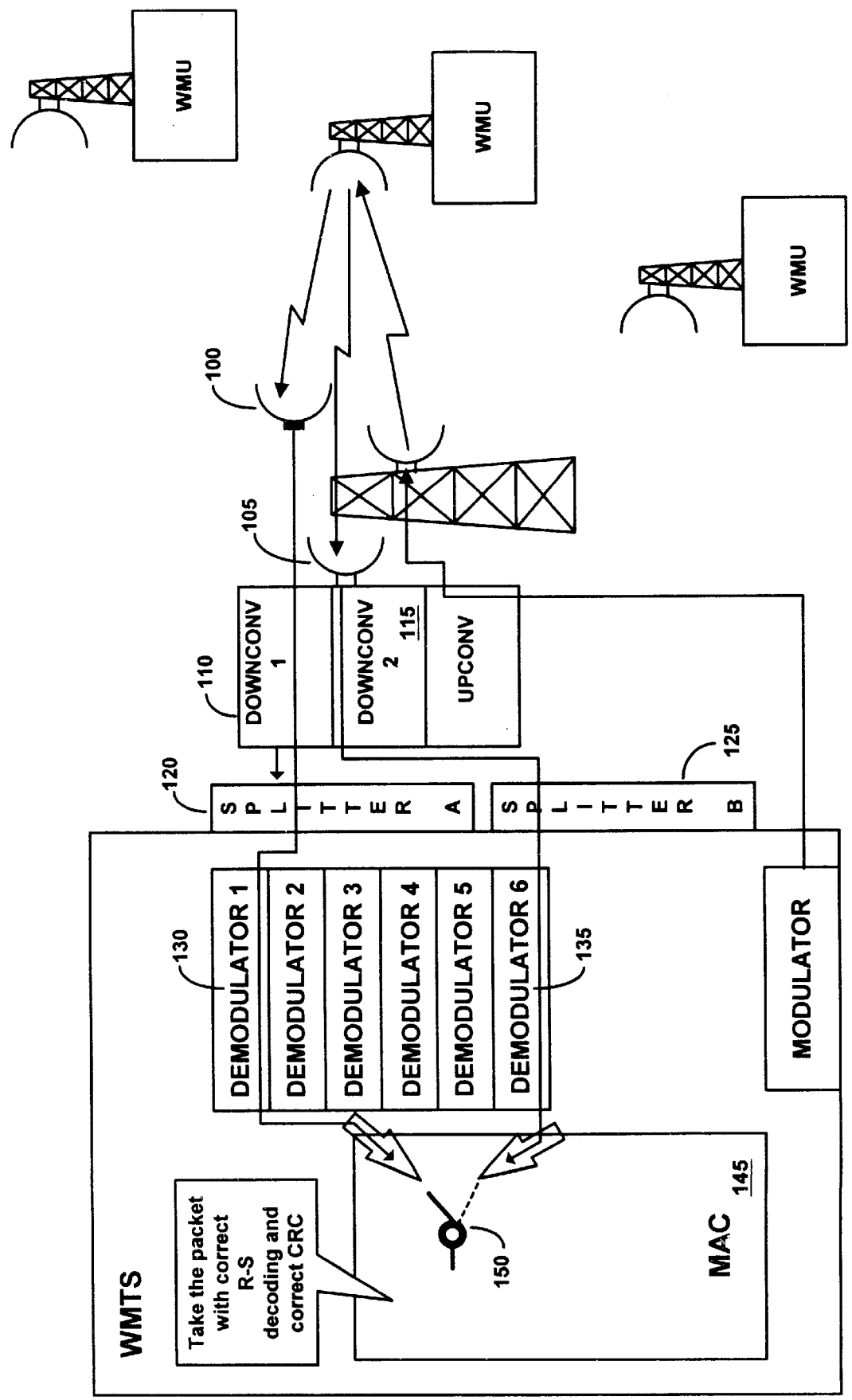
FIG. 1 is a block diagram of an implementation of the space diversity method and system of the invention.

The present invention comprises a post-detection selection diversity algorithm. This function involves the physical layer and some of the MAC (media access control) layer decisions of a Wireless Hub. As illustrated in FIG. 1, a base station is equipped with two receiving antennas (antenna 100 and antenna 105). Each antenna is connected to a splitter (e.g., antenna 100 is connected to splitter 110, and antenna 105 is connected to splitter 115) that feeds a bank of channel demodulators operating on various frequencies (e.g., demodulator 130 demodulates the signal from splitter 110, and demodulator 135 demodulates the signal from splitter 115). Some frequencies show up on both arms, so that the input signal is simultaneously demodulated twice (including the FEC-forward error correction-decoding) in two statistically independent events and processed on the MAC layer for better optimized analysis.

At PHY (the physical layer level), the upstream signal is demodulated and passed through a de-scrambler prior to the FEC decoder. The de-scrambled data consists of variable length FEC codewords that are pre-programmed according to the burst attributes setting. Each FEC decoder issues a decoding success signal.

At the MAC level, the selection process begins for each codeword on pre-defined pairs of upstream signals. If only one of the channels fails (and not both) to generate the decoding success signal the MAC selects the complementary signal that provides successful decoder data for higher Layer 2 processing. Where both signals are true the MAC forwards both information bytes from the two successful decoders for further processing at Layer 2. This process occurs for every FEC codeword.

FIG. 1 shows one selection switch 150 for simplification. Actually, there is a switch for every pair of demodulators that operate on the same frequency. The switch 150 is preferably implemented in embedded code (firmwave) and set and controlled by non real-time software. The MAC 145 provides an FEC statistical error table, the table containing all involved codeword errors within a received frame as part of the released frame to higher level.

When FEC is not selected in a burst profile, the MAC processor computes the header or E-header CRC (cyclic redundancy code) and frame or fragment CRC simultaneously within the involved upstream signals. If a bad header check sequence (HCS) occurs within an upstream signal, the MAC selects the complement upstream information data where the HCS is correctly computed. From this step the PDU CRC is computed on the same upstream signal. Where the involved upstream channels provide correct HCS, the MAC carries simultaneous FCS (frame check sequence) computation until the decision is made. The MAC therefore selects and transfers one of the PDUs (protocol data units) with the correct computed CRC only.

Figure 2:
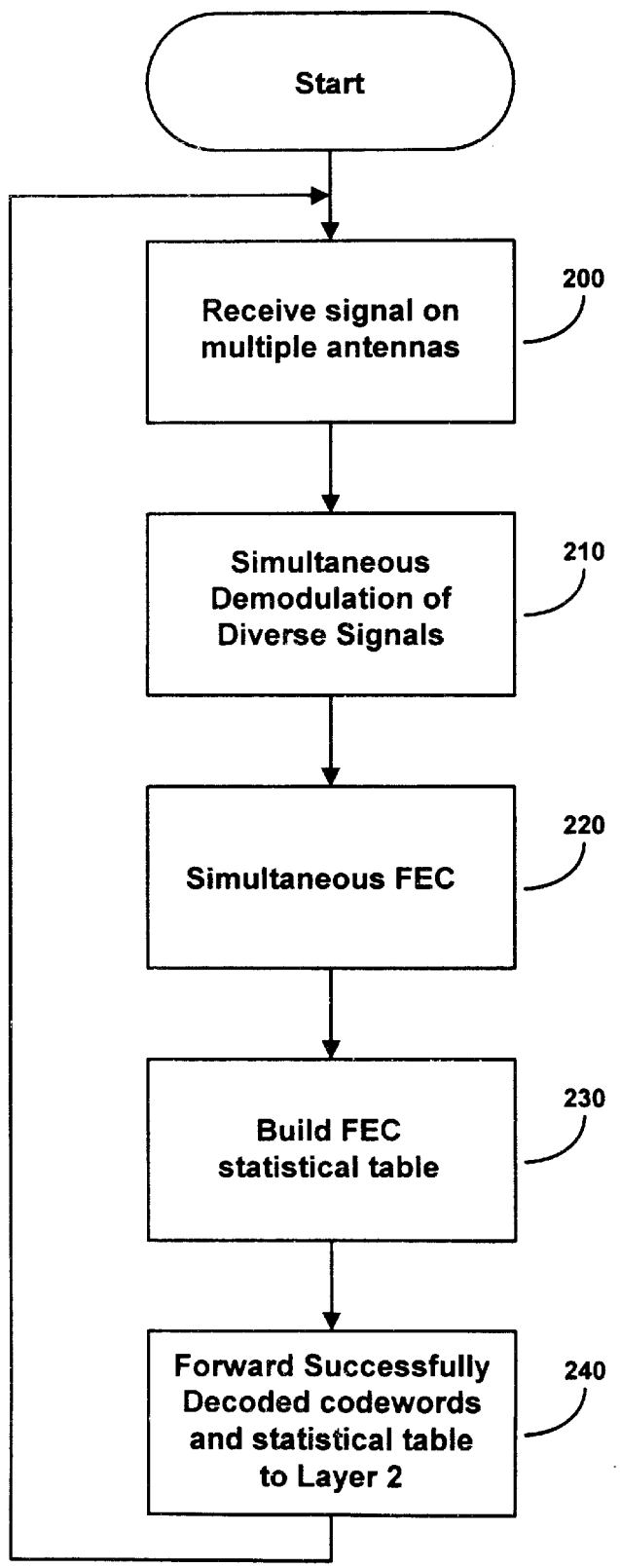
FIG. 2 is a flow chart of illustrating process flows for some features of an embodiment of the present invention.

FIG. 2 is a flow chart that illustrates process flows for some features of an embodiment of the present invention. At step 200, diverse signals are received. The diverse signals are simultaneously demodulated (step 210), and Forward Error Correction is performed on codewords (step 220). Other correction schemes may be utilized. At step 230, a statistical table (see examples below) is created. The statistical table is then forwarded as described herein, and may be utilized to create a user display of information regarding system throughput, errors, etc.

Not all of the channels are necessarily preset to provide space diversity. Some channels might have space diversity and others might lack it. Regardless, space diversity integrates very well with the dynamic channel allocation of the present invention, where each modem finds its adequate operation channel, thus allowing for a self-organizing network.

The NMS (network management system) is capable of configuring space diversity between any pair of upstream channels within a multiple channel module. For example, an upstream channel may have a bandwidth of 200 kHz, 400 kHz, 800 kHz, 1.6 MHz, or 3.2 MHz. The channels are identified as Primary and Secondary, where the Secondary upstream channel adopts all PHY settings of the primary upstream channel. The NMS accepts three configuration parameters relating to space diversity for every upstream channel:

Diversity Configuration—Determines whether the channel is in diversity mode.

Space Diversity Primary/Secondary—If the channel is assigned as Primary, the PHY fields accept all inputs, just as if the channel was assigned "No Space Diversity" in the Diversity Configuration field.

Associated Channel—If the channel is assigned as Primary, this field is not valid. If the channel is assigned as Secondary, this field contains the identification of the Primary channel. The Secondary channel duplicates the PHY settings of the Primary channel when in a diversity mode of operation.

Table 1 summarizes valid space diversity configurations.

TABLE 1

Space Diversity Configuration and Combinations

| | Space Diversity Configuration Fields | | |
|---|---|---|---|
| Diversity Configuration | Space Diversity Primary/ Secondary | Associated Channel | PHY Input Fields (reference only) |
| Space Diversity | Primary | N/A (does not accept input) | Accepts all parameters (symbol rate, etc.) |
| Space Diversity | Secondary | Accepts primary channel identification | N/A (does not accept input) |

TABLE 1-continued

Space Diversity Configuration and Combinations

| | Space Diversity Configuration Fields | | |
|---|---|---|---|
| Diversity Configuration | Space Diversity Primary/ Secondary | Associated Channel | PHY Input Fields (reference only) |
| No Space Diversity | N/A (does not accept input) | N/A (field does not accept input) | Accepts all parameters (symbol rate, etc.) |

Statistics

The following statistics are preferably available for the space diversity mode of operation of the present invention. These statistics are available on the primary channel menu and are maintained for every pair of channels configured for space diversity. Tables 2 and 3 summarize the statistic configuration and output fields, respectively.

TABLE 2

Space Diversity Statistic Configuration Fields

| Field | Description |
|---|---|
| Total Codewords (For FEC only) | Diversity Codword statistics shall be calculated over a sliding window of length "Total Codewords". This value shall represent the "Total Codewords" field. The valid range for this parameter is 1000 to 10,000,000. |
| HCS (No FEC) | Diversity HCS statistics shall be calculated over a sliding window of Number of frames "Total HCS". This value shall represent the "Total HCS" field for the examination. The valid range for this parameter is 10 to 1,000. |
| FCS (No FEC) | Diversity FCS statistics shall be calculated over a sliding window of Number of frames "Total FCS". This value shall represent the "Total FCS" field or number of frames for the examination. The valid range for this parameter is 1,000 to 1,000,000. |
| Get Statistics | A "button" that initiates the retrieval of Space Diversity Statistics (ref. Table 3). By pressing this button the statistic test starts and at the end of Total Codewords, total HCS and total FCS, displays the result. If a test was running when pressing Get, it is aborted and the new one starts. |

TABLE 3

Space Diversity Statistic Output Field

| Field | Description |
|---|---|
| Primary Channel Codeword Error Rate | Unsuccessful Decodings on Primary Channel/Total Codewords |
| Secondary Channel Codeword Error Rate | Unsuccessful Decodings on Secondary Channel/Total Codewords |
| Combined Channel Codeword Error Rate | Simultaneous unsuccessful Decoding on both channels/Total Codewords |
| Primary Channel Selection Percentage | [Primary Channel Selection/Total Codewords] × 100 |
| Secondary Channel Selection Percentage | [Secondary Channel Selection/Total Codewords] × 100 |
| Primary Channel HCS | Failed MAC HCS on Primary Channel |
| Secondary Channel HCS | Failed MAC HCS on Secondary Channel |
| Primary or Secondary Channel HCS Error Rate | Failed HCS on Primary or Secondary Channel/Total HCS |
| Combined Channel HCS | Simultaneous Failed HCS on both channels/ |

TABLE 3-continued

Space Diversity Statistic Output Field

| Field | Description |
| --- | --- |
| Error Rate | Total HCS |
| Primary Channel FCS | Failed FCS on Primary Channel |
| Secondary Channel FCS | Failed FCS on Secondary Channel |
| Primary or Secondary Channel FCS Error Rate | Failed FCS on Primary or Secondary Channel/Total FCS |
| Combined Channel FCS Error Rate | Simultaneous Failed FCS on both channels/Total FCS |

Interaction with Redundancy Functions

The diversity channels are preferably co-located on the same upstream demodulation card, whereupon a Diversity Configuration setting is set to "Space Diversity". If either channel fails on an upstream card, the system switches both the Primary and Secondary channels to a different upstream demodulation card. All PHY layer parameters are thereby automatically configured to the conditions that existed before the protection switch was triggered, to fully implement the redundancy requirement of the DOCSIS standard.

The present invention therefore provides a novel space diversity method and system for broadband wireless access. Although the present invention has been shown and described with respect to preferred embodiments, various changes and modifications lie within the spirit and scope of the claimed invention. Thus, the corresponding structures, materials, acts, and equivalents of all means or step plus function elements in the claims in this patent application or any applications claiming priority therefrom are intended to include any structure, material, or acts for performing the functions in combination with other elements as specifically claimed.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, receiving spatially diverse signals, simultaneous demodulation and FEC of diverse signals, building and using statistical tables, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of space diversity for broadband wireless access, comprising the steps of:
   receiving spatially diverse signals;
   separately demodulating each of the spatially diverse signals;
   selecting a most correct of the demodulated signals; and forwarding the selected demodulated signal for further processing;
   wherein:
      said step of selecting comprises,
      performing FEC decoding on codewords contained in each of the spatially divese signals, and
      selecting decoded codewords that have been successfully FEC decoded; and
      if both of said spatially divese signals contain pairs of codewords that have been successfully FEC decoded, then selecting both decoded codewords.

2. The method according to claim 1, wherein:
   said spatially diverse signals include a channel designated as primary, and at least one channel designated as secondary; and
   said step of selecting comprises,
   selecting codewords decoded from the primary channel of said spatially diverse signals if the primary channel codewords were successfully decoded; and
   selecting codewords from a secondary channel of said spatially diverse signals if the primary channel codewords were not successfully decoded and the selected secondary channel codewords were successfully decoded.

3. A method of space diversity for broadband wireless access, comprising the steps of:
   receiving spatially diverse signals;
   separately demodulating each of the spatially diverse signals;
   selecting a most correct of the demodulated signals; and forwarding the selected demodulated signal for further processing;
   wherein said step of selecting includes the steps of:
      if said spatially diverse signals are not in burst mode, performing a FEC on codewords demodulated from the spatially diverse signals; and
      if said spatially diverse signals are in burst mode, performing Header, Frame, and PDU CRC.

4. A method of space diversity for broadband wireless access, comprising the steps of:

receiving spatially diverse signals;

separately demodulating each of the spatially diverse signals;

selecting a most correct of the demodulated signals;

forwarding the selected demodulated signal for further processing; and collecting statistics on at least one of Codeword error rates, selection percentage, header check sequence error rates, and frame check sequence error rates on at least one of a primary and secondary channel in said spatially diverse signals.

5. The method according to claim 4, wherein said statistics are collected for codewords over a sliding window range.

6. The method according to claim 5, wherein said sliding window range is 1000 to 10,000,000 code words in length.

7. The method according to claim 4, wherein said statistics for header check sequence are collected over a sliding window number of frames range.

8. The method according to claim 7, wherein said frames range is 10 to 1,000 frames.

9. The method according to claim 4, wherein said statistics for frame check sequence is calculated over a sliding window of number of frames range.

10. The method according to claim 9, wherein said frames range is 1,000 to 1,000,000.

11. The method according to claim 4, further comprising the step of:

displaying said statistics in response to a statistics display request.

12. The method according to claim 4, further comprising the step of allocating dynamic channels based on at least part of said statistics.

13. The method according to claim 4, further comprising the step of allocating primary and secondary channels based on at least part of said statistics.

14. The method according to claim 13, wherein said primary and secondary channels are configured in at least one of space diversity 1, a primary channel where all PHY parameters are accepted, space diversity 2, a secondary channel that identifies a primary channel and does not have any PHY parameters, and no space diversity, a channel not identified as primary nor secondary, has no associated channel, and accepts all PHY parameters.

15. The method according to claim 4, further comprising the steps of:

splitting each of the spatially diverse signals; and forwarding each pair of split signals to a pair of demodulators; and if one of said spatially diverse signals shows up on each arm of the split signal, optimizing said step of selecting by utilizing the split signals are independent events.

16. The method according to claim 4, wherein:

said method is embodied in a set of computer instructions stored on a computer readable media; and said computer instructions, when loaded into a computer and executed, cause the computer to perform the steps of claim 4.

17. A space diversity device for a wireless hub, comprising:

PHY layer equipment including:

a set of at least two antennas for receiving spatially diverse signals;

a demodulator connected to each of said antennas; and each demodulator configured to demodulate signals received on the antenna connected to it; and MAC layer equipment comprising a selection mechanism configured to select a demodulated signal having a largest error free transmission;

an FEC decoding device having a decoding success indicator;

said FEC decoding service connected to said demodulator and configured to perform FEC on codewords transmitted in said signals;

wherein said MAC layer equipment selection mechanism selects the demodulated signal based on said decoding success indicator for each decoded codeword;

said device further comprising:

a header CRC device connected to said demodulator and configured to perform a CRC check on demodulated frame headers;

a frame CRC device connected to said demodulator and configured to perform a CRC check on demodulated frame; and a PDU CRC device connected to said demodulator and configured to perform a CRC check on demodulated PDUs;

wherein said MAC layer equipment selection mechanism selects the demodulated signal based on said header, frame, and PDU CRC checks.

18. The device according to claim 17, further comprising:

a splitter connected between each antenna and demodulator and configured to split the signal received on the connected antenna into upper and lower frequency ranges; and a signal optimization device connected to said splitter and configured to optimize the received signal by separately and independently evaluating each split signal if said splitter breaks the received signals into both the upper and lower frequency ranges.

19. The device according to claim 17, further comprising a statistics gathering device configured to track a sliding window of transmission errors in the received signals.

20. The device according to claim 17, further comprising a statistics gathering device configured to track a sliding window of total codewords decoded by said decoding device.

21. A space diversity device for a wireless hub, comprising:

PHY layer equipment including, a set of at least two antennas for receiving spatially diverse signals, a demodulator connected to each of said antennas, and each demodulator configured to demodulate signals received on the antenna connected to it;

MAC layer equipment comprising a selection mechanism configured to select a demodulated signal having a largest error free transmission; and a statistics gathering device configured to track a sliding window of transmission errors in the received signals;

wherein said statistics gather device collects statistics for each of codewords in FEC non burst mode signals received by said antennas, header check sequence in burst mode signals received by said antennas, and frame check sequence in burst mode antennas received by said antennas.

22. The device according to claim 21, further comprising:

a user interface having, a statistics display invocation mechanism, and a display mechanism configured to read and display the gathered statistics.

23. The device according to claim 22, wherein said statistics display invocation mechanism in a button.

24. The device according to claim 22, wherein said gathered statistics are at least one of Primary Channel Codeword Error Rate, Secondary Channel Codeword Error Rate, Combined Channel Codeword Error Rate, Primary Channel Selection Percentage, Secondary Channel Selection Percentage, Primary Channel header check sequence, Secondary Channel header check sequence, Primary or Secondary Channel header check sequence Rate, Combined Channel header check sequence Error Rate, Primary Channel frame check sequence, Secondary Channel frame check sequence, Primary or Secondary Channel frame check sequence Error Rate, Combined Channel frame check sequence Error Rate.

25. The device according to claim 21, wherein said sliding window is between 1,000, and 10,000,000 codewords in length.

* * * * *